US006778617B1

(12) United States Patent
Celebi

(10) Patent No.: US 6,778,617 B1
(45) Date of Patent: Aug. 17, 2004

(54) METHODS AND DEVICES FOR SIMPLIFYING THE MINIMIZATION OF INTERBLOCK INTERFERENCE IN FINITE RESPONSE FILTERS

(75) Inventor: Samel Celebi, Little Falls, NJ (US)

(73) Assignee: Agere Systems, Inc., Allentown, PA (US)

( * ) Notice: Subject to any disclaimer, the term of this patent is extended or adjusted under 35 U.S.C. 154(b) by 517 days.

(21) Appl. No.: 09/639,640

(22) Filed: Aug. 16, 2000

(51) Int. Cl.[7] .............................. H03D 1/04; H03D 1/06; H03K 5/01; H03K 6/04; H04B 1/10; H04L 1/00; H04L 25/08
(52) U.S. Cl. ..................... 375/346; 375/285; 375/350
(58) Field of Search ............................... 375/285, 346, 375/348, 350, 229, 230

(56) References Cited

U.S. PATENT DOCUMENTS 4,105,863 A * 8/1978 Kustka ..................... 375/230
5,751,762 A * 5/1998 Dent ........................ 375/131

\* cited by examiner

*Primary Examiner*—Jean B. Corrielus

(57) ABSTRACT

Interblock interference ("IBI") in impulse response affected signals is minimized by generating approximations of differential coefficients. The approximated coefficients are generated by taking into consideration that non-uniform amounts of IBI are present in portions of such a signal. Methods and devices used to minimize IBI are simplified by using the approximations.

13 Claims, 4 Drawing Sheets

WHERE:

$$C_K \text{ OR } C(K) = \begin{cases} -\sqrt{h_0 - k} & \text{if } k < h_0 \\ +1 & \text{if } h_0 \leq k \leq h_0 + M \\ -\sqrt{k - M - h_0} & \text{if } k > h_0 + M \end{cases}$$

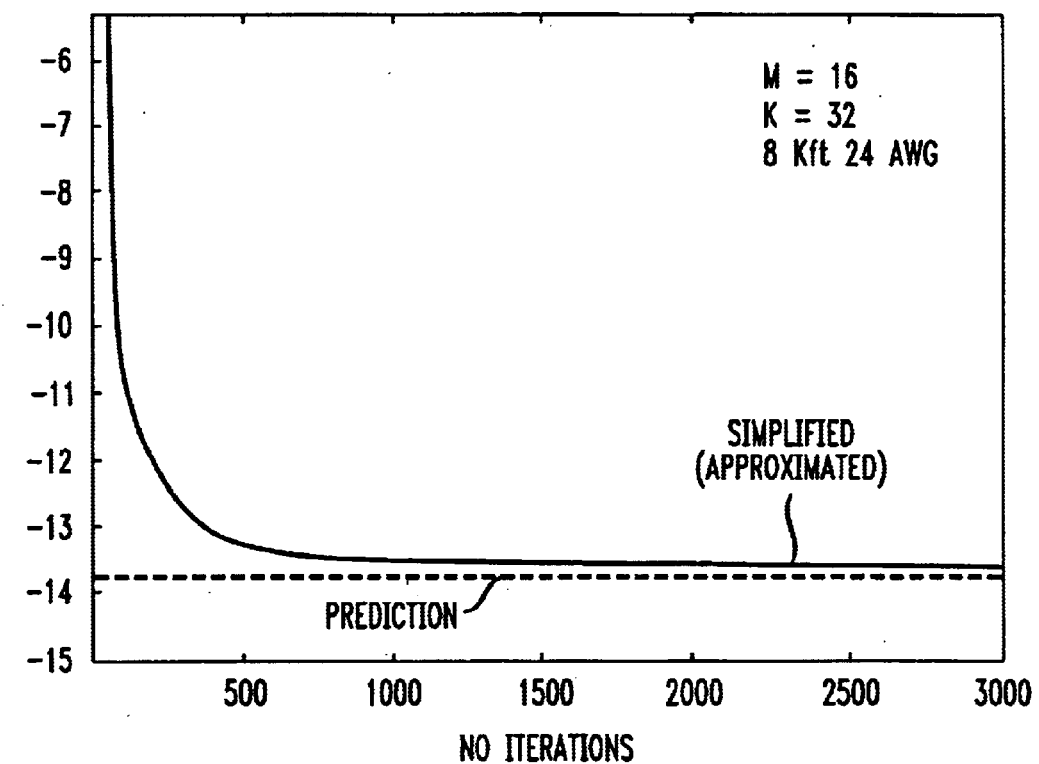

METHODS AND DEVICES FOR SIMPLIFYING THE MINIMIZATION OF INTERBLOCK INTERFERENCE IN FINITE RESPONSE FILTERS

BACKGROUND OF THE INVENTION

Co-pending U.S. patent application Ser. No. 09/639,641 sets forth methods and devices for minimizig IBI in finite impulse response filters ("FIRs"), such as time domain equalizers ("TEQs"), which are commonly made a part of digital multi-tone transceivers ("DMTs"). These methods and devices take advantage of a newly discovered relationship between IBI and points along the "tails" of a channel's impulse response. More specifically, as disclosed in co-pending U.S. patent application Ser. No. 09/639,641, the present inventor discovered that each point along the tail of a channel's impulse response contributes a non-uniform amount of IBI to a signal transmitted through the channel, rather than a uniform amount, as previously believed (both the signal and the channel's impulse response will sometimes be referred to collectively as "impulse response"). Additionally, the present inventor discovered that the amount of IBI contributed by each point along the tail increases linearly. That is, taking as a reference point a time of reference ("TOR") of a channel's impulse response (such as TORs disclosed in co-pending U.S. patent application Ser. No. 09/639,642), IBI increases linearly from point to point as the points are located farther and farther from the TOR (referred to hereafter as the "non-uniform contribution of IBI").

Co-pending U.S. patent application Ser. No. 09/639,641 sets forth novel methods and devices, such as TEQs for minimizing IBI based on these concepts. TEQs are commonly made a part of the front end of DMTs. One common example of a DMT is a digital subscriber loop ("DSL") transceiver (collectively DMTs and DSL transceivers can be referred to as "transceivers"). Besides needing to reduce IBI, it is important that FIRs or transceivers be affordable. Because cost is an issue, the circuitry (both hardware and software) making up an FIR, transceiver or the like must also be designed with cost in mind.

It might be very expensive to make the transceivers envisioned by co-pending U.S. patent application Ser. No. 09/639,641. Foreseeing this, the present inventor sought to discover new, simplified methods and devices for minimizing IBI in FIRs, transceivers and the like which were more economical.

Accordingly, it is a desire of the present invention to provide for methods and devices for simplifying the minimization of IBI in FIRs and/or transceivers.

It is another desire of the present invention to provide for methods and devices for simplifying the minimization of IBI in FIRs and/or transceivers by taking into consideration the non-uniform contribution of IBI.

Other desires will become apparent to those skilled in the art from the following description taken in conjunction with the accompanying drawings and claims.

SUMMARY OF THE INVENTION

In accordance with the present invention there are provided methods and devices for simplifying the minimization of interblock interference. Such methods and devices comprise applying a weighting function to an output signal, where the weighting function comprises correction factors based on a non-uniform contribution of interblock interference. Thereafter, incremental, differential coefficients are generated from a weighted output signal and sampled input signals. The incremental coefficients are used to generate an approximated set of differential coefficients which in turn are used to generate differential coefficients from a final set of approximated, differential coefficients.

The differential coefficients are then applied to a sampled input signal to substantially minimize interblock interference.

Devices for carrying out the features and functions of the present invention include TEQs, DMTs and DSL receivers.

BRIEF DESCRIPTION OF THE DRAWINGS

FIG. 4 depicts a comparison of results from a TEQ made according to an embodiment of the present invention against results from a TEQ made according to an alternative technique.

DETAILED DESCRIPTION OF THE INVENTION

Figure 1:
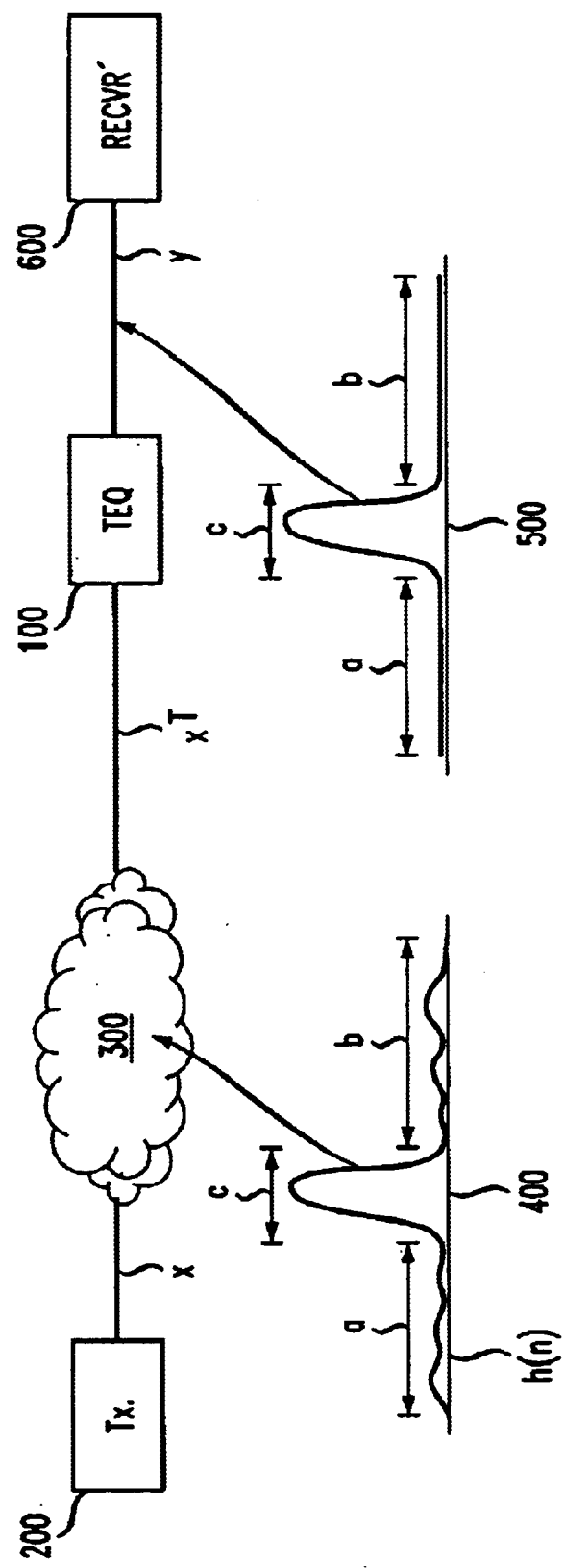
FIG. 1 depicts a simplified block diagram of a TEQ adapted to substantially minimize IBI according to one embodiment of the present invention.

FIG. 1 depicts a simplified block diagram of a TEQ 100 adapted to substantially minimize IBI according to one embodiment of the present invention.

As shown, signal X is sent by transmitter 200 through channel 300 having an impulse response, h(n) 400. Upon exiting the channel 300 the signal X has been changed by the channel's 300 impulse response, h(n) 400 to form signal $X^T$. One such change is due to the effects of IBI. Parts "a" and "b" of impulse response 400 are referred to as the "tails" of the impulse response while part "c" is referred to as the "main lobe".

In an illustrative embodiment of the present invention, TEQ 100 is adapted to simplify the minimization of IBI in the tails of impulse response affected signal $X^T$, taking into consideration the non-uniform contribution of IBI.

Signal 500 shown in FIG. 1 is an example of an output signal "y" having a minimal amount of IBI (i.e., the signal levels in tails "a" and "b" have been reduced).

It has been discovered by the present inventor that the minimization of IBI can be simplified by approximating equalizer coefficients. More specifically, these equalizer coefficients ("coefficients") are generated by a series of approximations (i.e., a first approximation of the coefficients is used to generate a second, closer approximation, which in turn is used to generate a third, yet closer, approximation, etc., until a final approximation is arrived at).

Factored into these approximations is a weighting function, $c_k$, which represents a set of correction factors (e.g., levels). These correction factors need to be applied in order to take into consideration the non-uniform contribution of IBI.

The resulting coefficients, $W_{opt}$, ultimately generated by the series of approximations are referred to as differential coefficients.

The differential coefficients, $W_{opt}$, are generated using the following relationship:

$$W_{opt} = W_p + \Delta W \quad (1)$$

Where $W_p$ comprises "present" values for the differential coefficients and $\Delta W$ comprises final, approximated values for the differential coefficients.

In an illustrative embodiment of the present invention, TEQ 100 is adapted to initially set $W_p$ at random values. For example, $W_p$ may comprise an initial vector $[0, \ldots 0, 1, 0 \ldots 0]$ where all but a middle value is set to zero. In addition, TEQ 100 is adapted to generate approximations $\Delta W$ using the following relationship:

$$\Delta W = \Delta W_p + \beta c_k y X^T \quad (2)$$

where $\Delta W_p$ represents present, approximations of the differential coefficients, $\beta$ represents the step size, $c_k$ represents the weighting function, y represents a corresponding output for each input x, and $X^T$ represents shifted or sampled versions of the impulse-response h(n).

In an illustrative embodiment of the present invention, TEQ 100 is adapted to generate approximations of the coefficients for each sample of $X^T$ input into TEQ 100. The process of generating new approximations continues until a maximum number of iterations is reached.

In an illustrative embodiment of the present invention, TEQ 100 is further adapted to add the final approximations $\Delta W$ to initial, random values $W_p$ to arrive at differential coefficients $W_{opt}$.

The present invention minimizes IBI in the tails of an impulse response affected signal by using a series of approximations. This technique represents a simplified technique compared to those disclosed in co-pending U.S. patent application Ser. No. 09/639,641. It is believed that such a simplified technique can be used to create less expensive FIRs, transceivers and the like compared to those disclosed in co-pending U.S. patent application Ser. No. 09/639,641.

Figure 2:
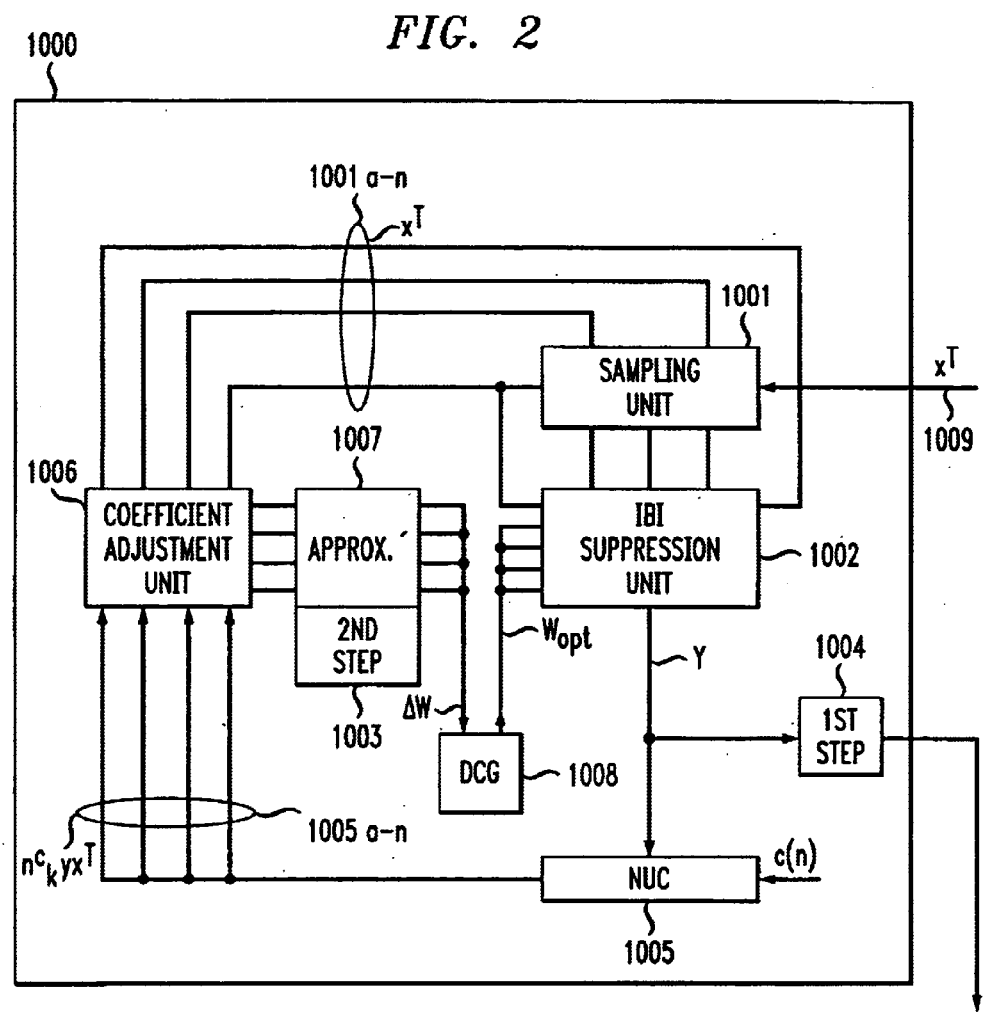
FIG. 2 depicts a block diagram of a TEQ adapted to substantially minimize IBI according to another embodiment of the present invention.

Referring now to FIG. 2, there is shown another embodiment of the present invention. As shown, FIR or TEQ 1000 is adapted to receive impulse response affected signal, $X^T$. More specifically, FIR 1000 comprises sampling unit or means 1001 adapted to receive signal $X^T$ and to break the signal $X^T$ into a number of samples $x^T$.

Sampling unit 1001 is then adapted to send samples $x^T$ to IBI suppression unit or means 1002 and coefficient adjustment unit or means 1006.

Upon receiving samples $x^T$, suppression unit 1002 is adapted to apply differential coefficients to the samples $x^T$ in order to substantially minimize IBI in the tails of samples $x^T$.

Initially, however, the differential coefficients applied to the samples are randomly selected (i.e., $W_p$ from before). As a result, the level of IBI within signal "y" output by the suppression unit 1002 is still relatively high.

To further reduce IBI, the differential coefficients must be adjusted. The present invention envisions adjusting the differential coefficients through the generation of a series of approximations which take into consideration the non-uniform contribution of IBI present in tails "a" and "b".

In one illustrative embodiment of the present invention, such approximations can be generated as follows.

Referring back to FIG. 2, non-uniform correction unit or means ("NUC") 1005 is adapted to receive initial output signal y (and all subsequent signals output from suppression unit 1002) and to apply non-uniform corrections to signal y. The non-uniform corrections applied to signal y comprises a series of correction factors.

Figure 3:
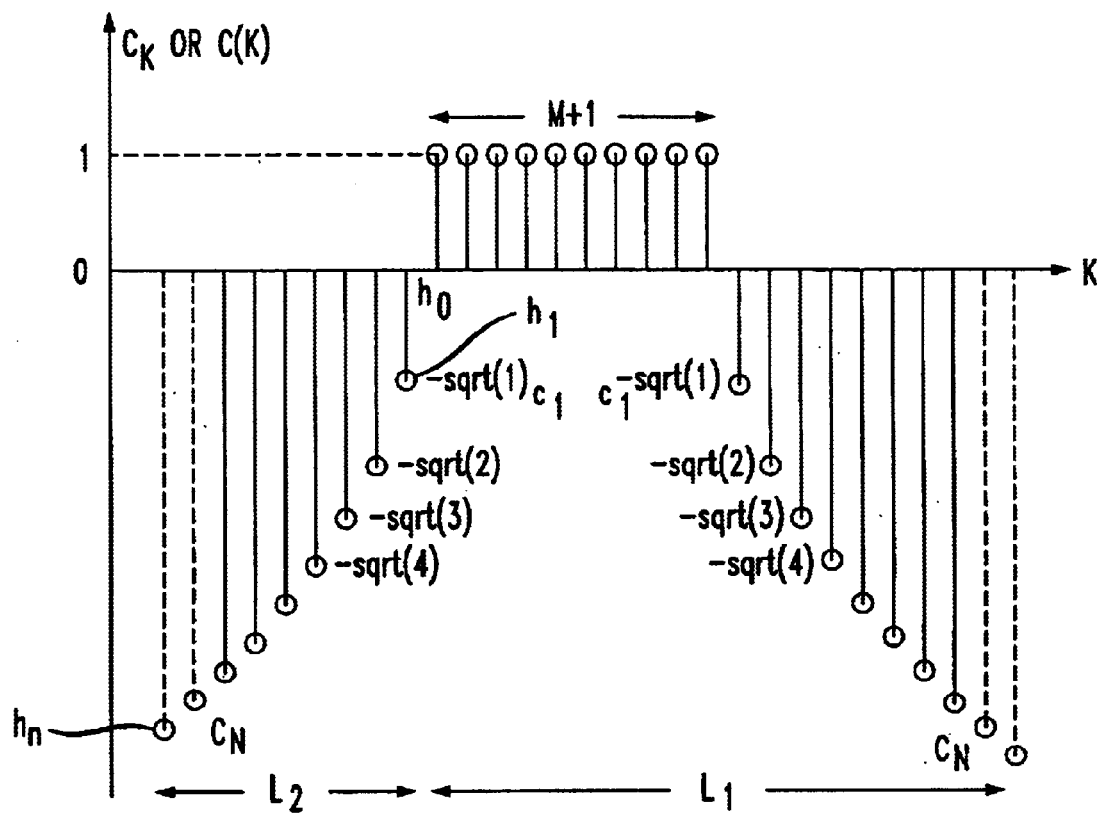
FIG. 3 depicts a weighting function $c_k$ according to one embodiment of the present invention.

In one embodiment of the present invention, the series of correction factors comprises weighting function $c_k$ graphically shown in FIG. 3.

Referring to FIG. 3, it can be seen that correction factors $c_1, c_2 \ldots c_n$ are applied to points in tails "a" and "b". Together, correction factors $c_n \ldots c_l$ and $c_l \ldots c_n$ comprise weighting function $c_k$.

Instead of applying the same uniform correction factor for each point along tail "a" or "b" as is done in existing FIRs, correction units envisioned by the present invention apply non-uniform correction factors. This is illustrated in FIG. 3, where the level or value of the correction factor changes from $c_l$ to $c_n$ and vice-versa within tails "a" and "b". In effect, a larger correction factor is applied to a point (e.g., $h_n$) further from TOR (e.g., point "$h_0$") than is applied to a point (e.g., $h_l$) closer to TOR $h_0$.

Continuing, NUC 1005 is further adapted to send a "weighted" output signal y (hereafter "weighted output") to coefficient adjustment unit 1006. At substantially the same time, first iteration counter 1004 is adapted to increment by one. Iteration counter 1004 is adapted to increment each time a new output is sent from suppression unit 1002. If the iteration counter reaches its final value, then the output signal y is sent to a receiver, such as receiver 600 shown in FIG. 1. If not, then the iteration counter 1004 is adapted to prevent output signal y from being sent to a receiver. In this manner, the output signal y can be fed back thru FIR 1000. Each time output signal is fed back thru FIR 1000, it is changed. By feeding output signal y back through FIR 1000, it is possible to steadily reduce the amount/level of IBI within the tails of signal y until a minimum level is reached.

Coefficient adjustment unit 1006 is adapted to receive weighted output or outputs 1005$a$–$n$ and, at substantially the same time, receive sampled input signals 1001$a$–$n$ from sample unit 1001. Upon receiving each set of signals 1005$a$–$n$, 1001$a$–$n$, adjustment unit 1006 is adapted to generate incremental, differential coefficients represented by the notation "$nc_k y X^T$" (hereafter referred to as "incremental coefficients"). Thereafter, approximator 1007 is adapted to receive the incremental coefficients and to generate an approximated set of differential coefficients, $\Delta W$.

Backtracking a little, it should be understood that approximator 1007 is adapted to add incremental coefficients from unit 1006 to a previous (or present) set of approximated coefficients, $\Delta W_p$. In this manner each time a different set of incremental coefficients are generated by the adjustment unit 1006 they used to generate a new set of approximated coefficients.

In an additional embodiment of the present invention, approximator 1007 is adapted to increment a second iteration counter 1003 which is adapted to increment by one each time new approximated coefficients are generated. If the final value of iteration counter has been met, then the approximator 1007 is adapted to output a final set of approximated coefficients $\Delta W$ to differential coefficients generator or means ("DCG") 1008. If the iteration counter final value has not been met, then the approximator 1007 is adapted to store the new approximate coefficients until the final value has been reached.

To summarize somewhat, it can be seen from FIG. 2 and the discussion above that each time a new sample is input into suppression unit 1002 a new output signal y is generated. Thereafter, this output signal is used to generate new incremental coefficients which are sent to approximator 1007 in order to generate new approximated coefficients. The approximator 1007 is adapted to store the approximated coefficients until such time as the iteration counter reaches its final value. In an illustrative embodiment of the present invention, the approximator 1007 is adapted to store the approximated coefficients at least until each sample $x^T$ of input signal $X^T$ is fed through suppression unit 1002. Once the iteration counter reaches its final value, the approximator 1007 is adapted to send the final, approximated coefficients, $\Delta W$, to the DCG 1008.

Differential coefficients generator 1008 is adapted to receive approximated coefficients $\Delta W$ from approximator 1007 and is further adapted to generate differential coefficients $W_{opt}$ by adding the approximated coefficients $\Delta W$ to a present set of coefficients $W_p$. Taken together, it should be understood that this "cycling" of sampled input signals $x^T$ and output signals y through FIR 1000 is used to generate a final set of differential coefficients $W_{opt}$. This final set of differential coefficients is then sent to suppression unit 1002 which is adapted to apply the coefficients $W_{opt}$ to sample input signal or signals $x^T$ in order to further reduce, and eventually substantially minimize, IBI.

It should be understood that the entire input signal $X^T$ is sampled and cycled thru FIR 1000 very quickly (e.g., in microseconds). It should also be understood that the input signal $X^T$ only represents a portion of the signal being received by FIR 1000. That is, by "entire" input signal $X^T$ is meant only a small portion of the signal being received by FIR 1000 via pathway 1009. Eventually all of the signal received by FIR 1000 will be cycled through as well.

To complete the cycle, IBI suppression unit 1002 applies the coefficients $W_{opt}$ to sampled input signals $x^T$. It is then adapted to output a signal y to the non-uniform correction unit 1005 and to the iteration counter 1004. If the final iteration counter value has been met then the output signal y is output to receiver 600. If not, the output signal is again sent thru FIR 1000 to begin the process all over again.

It should be understood that the components of the FIR 1000 shown in FIG. 2 are simplified block diagrams of components which can be used to carry out the features and functions of the present invention. The exact components used to carry out the features and functions may vary. For example: the approximator 1007 may comprise an integrator for integrating incremental coefficients with an existing set of approximated coefficients to generate a new set of approximated coefficients; DCG 1008 may comprise an adder for adding approximated coefficients to an existing set of differential coefficients; sampling unit 1001 may comprise delay units adapted to sample input signal $X^T$; and suppression unit 1002 and NUC 1005 may also comprise adders or multiplication units.

FIG. 4 depicts results from a FIR made accordingly to the present invention compared to results from an FIR made according to the disclosure in co-pending U.S. patent application Ser. No. 09/639,641. In FIG. 4, the dotted line represents a ratio of the energy in a main lobe versus the energy in tails of a composite, impulse response output from an FIR made according to the disclosure in co-pending U.S. patent application Ser. No. 09/639,641. The solid line represents a similar ratio, this time output from an FIR made according to an embodiment of the present invention.

As can be seen in FIG. 4, both FIRs substantially minimize IBI in the tails of a signal affected by a channel's impulse response.

Realistically, provided the number of iterations is 1000 or greater, FIRs envisioned by the present invention can achieve approximately the same results as FIRs disclosed in co-pending U.S. patent application Ser. No. 09/639,641. That is, methods and devices envisioned by the present invention can substantially minimize IBI in a signal affected by a channel's impulse response. Unlike the methods and devices envisioned by co-pending U.S. patent application Ser. No. 09/634,641, the present invention envisions simplified methods and devices for substantially minimizing IBI. Such methods and devices comprise the generation of a series of approximated coefficients based on the non-uniform contribution of IBI, which are then used to suppress IBI.

Though the above discussion focuses on devices for simplifying the minimization of IBI, the present invention also envisions methods for carrying out the same features and functions.

Is to be understood that changes and variations may be made without the departing from the spirit and scope of this invention as defined by the claims that follow.

I claim:

1. A method for simplifying the minimization of interblock interference comprising:

applying a weighting function to an output signal to generate a weighted output signal; and generating incremental, differential coefficients from the weighted output signal and sampled input signals.

2. The method as in claim 1 wherein the weighting function comprises correction factors based on a non-uniform contribution of interblock interference.

3. The method as in claim 1 further comprising generating an approximated set of differential coefficients.

4. The method as in claim 3 further comprising generating differential coefficients from a final set of approximated, differential coefficients.

5. The method as in claim 4 further comprising applying the differential coefficients to sampled input signals to substantially minimize interblock interference.

6. A device for simplifying the minimization of interblock interference wherein the device comprises a finite impulse response filter adapted to apply a weighting function to an output signal to generate a weighted output signal and to generate incremental, differential coefficients from the weighted output signal and sampled input signals.

7. The device as in claim 6 wherein the weighting function comprises correction factors based on a non-uniform contribution of interblock interference.

8. The device as in claim 6 wherein the filter is further adapted to generate an approximated set of differential coefficients.

9. The device as in claim 8 wherein the filter is further adapted to generate differential coefficients from a final set of approximated, differential coefficients.

10. The device as in claim 9 wherein the filter is further adapted to apply the differential coefficients to sampled input signals to substantially minimize interblock interference.

11. The device as in claim 6 wherein the device comprises a time domain equalizer.

12. The device as in claim 6 wherein the device comprises a digital, multi-tone transceiver.

13. The device as in claim 6 wherein the device comprises a digital subscriber loop transceiver.

* * * * *